(12) United States Patent
Ratica

(10) Patent No.: US 8,321,589 B2
(45) Date of Patent: Nov. 27, 2012

(54) INTELLIGENT SERVER ROUTING

(75) Inventor: Adam Ratica, Painesville, OH (US)

(73) Assignee: CardinalCommerce Corporation, Mentor, OH (US)

( * ) Notice: Subject to any disclaimer, the term of this patent is extended or adjusted under 35 U.S.C. 154(b) by 542 days.

(21) Appl. No.: 12/548,819

(22) Filed: Aug. 27, 2009

(65) Prior Publication Data

US 2010/0057934 A1  Mar. 4, 2010

Related U.S. Application Data

(60) Provisional application No. 61/092,242, filed on Aug. 27, 2008.

(51) Int. Cl.
*G06F 15/173* (2006.01)
(52) U.S. Cl. ........................................ 709/240
(58) Field of Classification Search .................. 709/240, 709/227, 21, 226
See application file for complete search history.

(56) References Cited

U.S. PATENT DOCUMENTS

| | | | |
|---|---|---|---|
| 5,644,720 A * | 7/1997 | Boll et al. ............... | 709/227 |
| 6,014,700 A * | 1/2000 | Bainbridge et al. ....... | 709/226 |
| 6,957,254 B1 * | 10/2005 | Iterum et al. ............ | 709/221 |
| 7,051,002 B2 | 5/2006 | Keresman, III et al. | |
| 8,041,823 B2 * | 10/2011 | Qiu et al. ............... | 709/227 |
| 2002/0103663 A1 | 8/2002 | Bankier et al. | |
| 2004/0167840 A1 | 8/2004 | Tully et al. | |
| 2005/0038890 A1 | 2/2005 | Masuda et al. | |
| 2007/0000999 A1 | 1/2007 | Kubo et al. | |
| 2008/0126630 A1 | 5/2008 | Farkas et al. | |

OTHER PUBLICATIONS

International Search Report, Oct. 2, 2009.
European Search Report dated Jun. 25, 2012.

* cited by examiner

*Primary Examiner* — David Eng
(74) *Attorney, Agent, or Firm* — Fay Sharpe LLP

(57) ABSTRACT

The present application relates to methods and systems for intelligently routing requests to one of a plurality of redundant servers. The methods and systems route the requests to a most highly ranked redundant server. The redundant servers are dynamically rank according to ranking information, wherein the ranking information may include server performance information, server response information, next step performance information, next step response information, historic information and other like information. Next step response information and next step performance information corresponds to information pertaining to servers the plurality of redundant servers depend upon. The methods and systems may further randomly re-rank the plurality of redundant servers. The methods and systems may further re-route unprocessed requests meeting non-performance criteria.

19 Claims, 3 Drawing Sheets

INTELLIGENT SERVER ROUTING

This application claims the benefit of U.S. Provisional Application No. 61/092,242, filed Aug. 27, 2008, incorporated herein by reference in its entirety.

TECHNICAL FIELD

The present disclosure generally relates to methods and/or systems for selecting one of a plurality of redundant servers providing on-line services over a telecommunications network. Particular application is found in connection with systems that provide authentication support and/or other payment processing solutions for e-commerce and/or like transactions conducted over a telecommunications network, e.g., such as the Internet. However, it is to be appreciated that the presently disclosed subject matter is equally amenable to other like applications and/or environments.

BACKGROUND

Internet commerce, or e-commerce as it is otherwise known, relates to the buying and selling of products and/or services between consumers and merchants over the Internet or other like transactional exchanges of information. The convenience and availability of shopping over the Internet has sparked considerable interest in e-commerce on behalf of both consumers and merchants. This increased interest in e-commerce has, in turn, sparked an increase in network traffic and an increase in the number of requests e-commerce services must address. To handle this increase in requests, e-commerce services generally route requests for a service between a plurality of redundant servers. This reduces the response times for requests and/or the load of any single server. As should be appreciated, this has the added advantage of providing redundancy in the event of server failure, whereby an e-commerce service may employ a plurality of redundant servers irrespective of the number of requests. Such redundant servers may, for example, be located at geographically disparate locations, so as to protect against localized failures. Unfortunately, heretofore, the routing of requests between the plurality of servers has been, in a sense, "dumb."

Namely, traditional routing systems for routing requests between a plurality of redundant servers generally route requests to redundant servers and forget about them; they have no ability to re-route a request should the server a request was routed to prove to be non-performant. For example, if a request is assigned to a non-performant server, notwithstanding that the server appears to be performant, the request will eventually fail by way of timeout or simply be addressed by the non-performant server in a suboptimal amount of time. Accordingly, it would be advantageous to have a routing system that monitors whether requests have been processed and re-routes the requests after certain non-performance criteria have been met.

Additionally, some traditional routing systems may include an internal ranking of redundant servers based largely upon a historic bias, whereby the rankings may be slow to change. For example, consider a ranking on the basis of the average response time of 1000 response time measurements. Adding another measurement is going to affect the average response time in a minimalistic way. However, server failure issues may arise unexpectedly, whereby internal rankings according to the foregoing ranking scheme would be slow to adapt. Similarly, if servers are ranked with a historic bias according to some performance criteria, such as response time, and the most highly ranked server has a strong historic bias of performance, internal rankings according to the foregoing ranking scheme would be less likely to try another server that may have higher performance than the most highly ranked server at the present time. Accordingly, it would be advantageous to have a routing system that periodically re-ranks servers in a random order, so as to reset any historic bias that may have accrued.

What's more, other traditional routing systems generally fail to look at the substance of responses to requests. Namely, other routing systems are generally content to look at response times. However, such approaches fail to account for server failures in which the server is not entirely non-performant. For example, consider a web server in which an internal database server from which it depends crashed. If routing web requests to the web server, the response time of the server may be excellent; however, the server may be returning error messages that lack substance responsive to a request. Accordingly, it would be advantageous to have a routing system that is able to examine responses from redundant servers to determine whether the redundant servers are operating properly and returning proper responses.

Moreover, other traditional routing systems generally fail to take into account the dependencies between redundant servers and other servers, and only monitor the redundant servers. However, each redundant server may include at least one server from which it depends. Naturally, if there is failure of any of the at least one server from which a redundant server depends, the redundant server will fail, whereby a request to the redundant server will fail. Consider, for example, a performant directory server dependent upon a nonperformant authentication server. Traditional routing systems may determine the directory server is sufficiently performant to route requests to, notwithstanding that it is returning bad responses or not returning responses at all. Accordingly, it would be advantageous to have a routing system that not only monitors the redundant servers, but also examines the servers from which the redundant servers depend.

Notwithstanding performance issues, traditional routing systems generally lack means to detect whether the reason for non-performance of a redundant server is due to fraud or simply system failure. However, this poses a problem given that increased interest in e-commerce has led to more and more stories emerge regarding identity theft and cyber crime, which has, in turn, led to a deterioration of consumer confidence in the security of their personal information. Naturally, a reduction in consumer confidence leads to fewer e-commerce transaction because the willingness of consumers to purchase goods and/or services electronically is inversely proportional to the apprehension they may have about the safety of their personal information. Accordingly, it would be advantageous to have a routing system that includes means to detect whether the reason for non-performance of a server is due to fraud or simply system failure.

Supplemental to the foregoing, one area in which an intelligent server router finds particular application is for certain authentication initiatives, such as Visa's Verified by Visa (VbV) initiative. Therein, directory servers are employed in connection with processing transaction authentication requests. Naturally, if a directory server fails, transactions cannot be completed, whereby merchants, banks, credit card companies, etc. lose out on revenue. Accordingly, it is common for a plurality of directory servers to be available to a requestor, whereby it is generally desirable to select the directory server providing the optimal response time and/or performance.

FIG. 1 illustrates one such exemplary authentication initiative. As shown in this example, a consumer/cardholder 10, e.g., employing a suitable web browser or the like, is making an on-line purchase, e.g., over the Internet, from a merchant 20. As is known in the art, the illustrated back-end payment processing chain includes an optional payment gateway 30, the merchant's financial institution or acquiring bank 32, the credit card network 34 and the issuing bank 36.

At a point of checkout, the consumer 10 selects an appropriate payment method based on the initiatives supported by the merchant 20. At this point, the consumer fills out the on-line checkout form including a payment option, card number, expiration date, etc. Based on the payment information, the merchant 20, via a plug-in 22 installed on their server, passes a verify enrollment request (VEReq) message to a directory 38 on a server, e.g., suitably operated by the credit card network 34. The directory 38 includes a database associating participating merchants with their acquiring banks and a database associating card number ranges with locations or addresses, e.g., universal resource locator (URL) addresses, of issuing banks' authentication servers, e.g., the authentication server 40 for issuing bank 36. The VEReq message is a request to verify the enrollment of the card in the authentication program, and it contains the card number provided by the consumer 10.

Based on the card number range stored within the directory, the VEReq message will be sent to the appropriate URL address for the server 40 which returns to the merchant 20 via the directory 38 a response thereto, i.e., a verify enrollment response (VERes). That is to say, the server 40 will verify the enrollment status of the card and respond with a VERes message to the directory 38 which is then passed back to the merchant's plug-in component 22.

Based on the VERes message (i.e., if positive), the merchant plug-in component 22 will redirect the cardholder's browser to the server 40 by passing it a payer authentication request (PAReq) message generated by the merchant's plug-in component 22. The consumer 10 then completes an authentication process directly with the server 40. The authentication server 40 authenticates the consumer/cardholder 10 and responds to the merchant 20 with a payer authentication response (PARes) message including a digital signature. The merchant's plug-in component 22 validates the digital signature of the PARes and extracts the authentication status and other specified data that is to be used by the merchant 20 during the payment authorization process carried out via the back-end payment processing chain. For example, the merchant 20 sends an authorization/sale transaction to their payment gateway 30 along with the data elements received from the PARes. The payment gateway 30 routes the data to the acquiring bank 32 based on the acquirer's specification. The acquiring bank 32 then sends the data via the appropriate credit card network 34 to the issuing bank 36 for settlement.

The present invention contemplates a new and improved system and/or method which overcomes the above-referenced problems and others.

INCORPORATION BY REFERENCE

The disclosure of U.S. Pat. No. 7,051,002 for "Universal Merchant Platform for Payment Authentication," by Keresman, III et al., filed Jun. 12, 2003, is hereby incorporated herein in its entirety.

BRIEF DESCRIPTION

In accordance with one aspect of the present application, a computer implemented method for routing requests to one of a plurality of redundant servers is provided. The plurality of redundant servers provides services over a communications network. The method includes receiving a request via the communications network and selecting a highest ranked redundant server from the plurality of redundant servers for the request. The highest ranked redundant server is selected according to an intelligent server selection engine that dynamically ranks the plurality of redundant servers according to ranking information. The ranking information includes server performance information and server response information. The method further includes routing the request to the highest ranked redundant server.

In accordance with another aspect of the present application, an intelligent server router for routing requests to one of a plurality of redundant servers is provided. The plurality of redundant servers provides services over a communications network. The system includes an intelligent server selection engine provisioned to dynamically rank the plurality of redundant servers according to ranking information. The ranking information includes server performance information and server response information. The intelligent server selection engine further selects a highest ranked redundant server from the plurality of redundant servers according to the ranking of the plurality of redundant servers. The system further includes a real-time analysis engine provisioned to determine unprocessed requests meeting non-performance criteria and update a highest ranked redundant server for each of the determined unprocessed requests. Unprocessed requests are requests which have not been processed by highest ranked redundant servers assigned by the intelligent server selection engine. The system further includes a routing engine provisioned to receive the requests and route each of the requests to one of the plurality of redundant servers. The one of the plurality of redundant servers is a highest ranked redundant server determined by the intelligent server selection engine. The routing engine is further provisioned to re-route requests to highest ranked redundant servers updated by the real-time analysis engine.

In accordance with another aspect of the present application, a computer implemented method for supporting authentication processing of a commercial transaction conducted over a communications network between a first party and a second party is provided. The commercial transaction uses one of a plurality of different payment instrument types belonging to different payment networks. The plurality of different payment instrument types have different authentication protocols prescribed therefor by their respective payment networks. The method includes obtaining payment information from the first party according to a unified message format, wherein the first party received the payment information from the second party. The payment information includes a payment instrument identifying the one of the plurality of different payment instrument types. The method further includes selecting one of at least one directory server associated with the one of the plurality of different payment instrument types. Each of the at least one directory server is ranked according to an intelligent server selection engine that dynamically ranks the at least one directory server according to ranking information. The ranking information includes server performance information and server response information. The one of the at least one directory server is a highest ranked directory server. The method further includes routing the payment instrument to the selected directory server according to a message format of the one of the plurality of different payment instrument types. The selected directory server routes the payment instrument to an authentication server associated with the payment instrument. The method further includes obtaining an enrollment determination of the payment instrument from the selected directory server. The selected direct server receives the enrollment determination of the payment instrument from the authentication server.

BRIEF DESCRIPTION OF THE DRAWINGS

The presently disclosed subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION

For clarity and simplicity, the present specification shall refer to structural and/or functional network elements, entities and/or facilities, relevant standards, protocols and/or services, and other components that are commonly known in the art without further detailed explanation as to their configuration or operation except to the extent the same has been modified or altered in accordance with and/or to accommodate aspects of the present invention.

The presently disclosed inventive system and/or method essentially serves to monitor the performance of various redundant servers used for processing requests for a service, such as those for on-line services and/or databases. In one exemplary embodiment, the inventive system is applied to directory servers, such as the ones operated by Visa for VbV. Suitably, the system, by assigning different limit variables as criteria, monitors and analyzes various types of information, and based on the information received, dynamically ranks the servers. The monitored information includes, for example, server performance information, server response information, next step performance information, next step response information, historic information, and other like information. In the case of next step performance information and next step response information, ranking for a server can be reduced if the server forwards to a next step server that is relatively or sufficiently non-performant. Further, at periodic intervals the ranking is randomly shuffled with an optional historic bias and re-ranked. As should be appreciated, the dynamic ranking in this manner assures high availability of the service, while the random shuffling assures the best performance of the service.

A further feature of the inventive subject matter adds the capability to determine if non-performance of a server is due to a system failure or intentional (e.g., fraudulent) behavior. For example, using an automated system and/or method, test requests can be tracked through redundant servers and/or next step servers, and the results returned can be used to determine if requests that are being returned unanswered, or that don't return at all, can be deemed as the result of poor performance of the given server or as the result of fraud.

Figure 1:
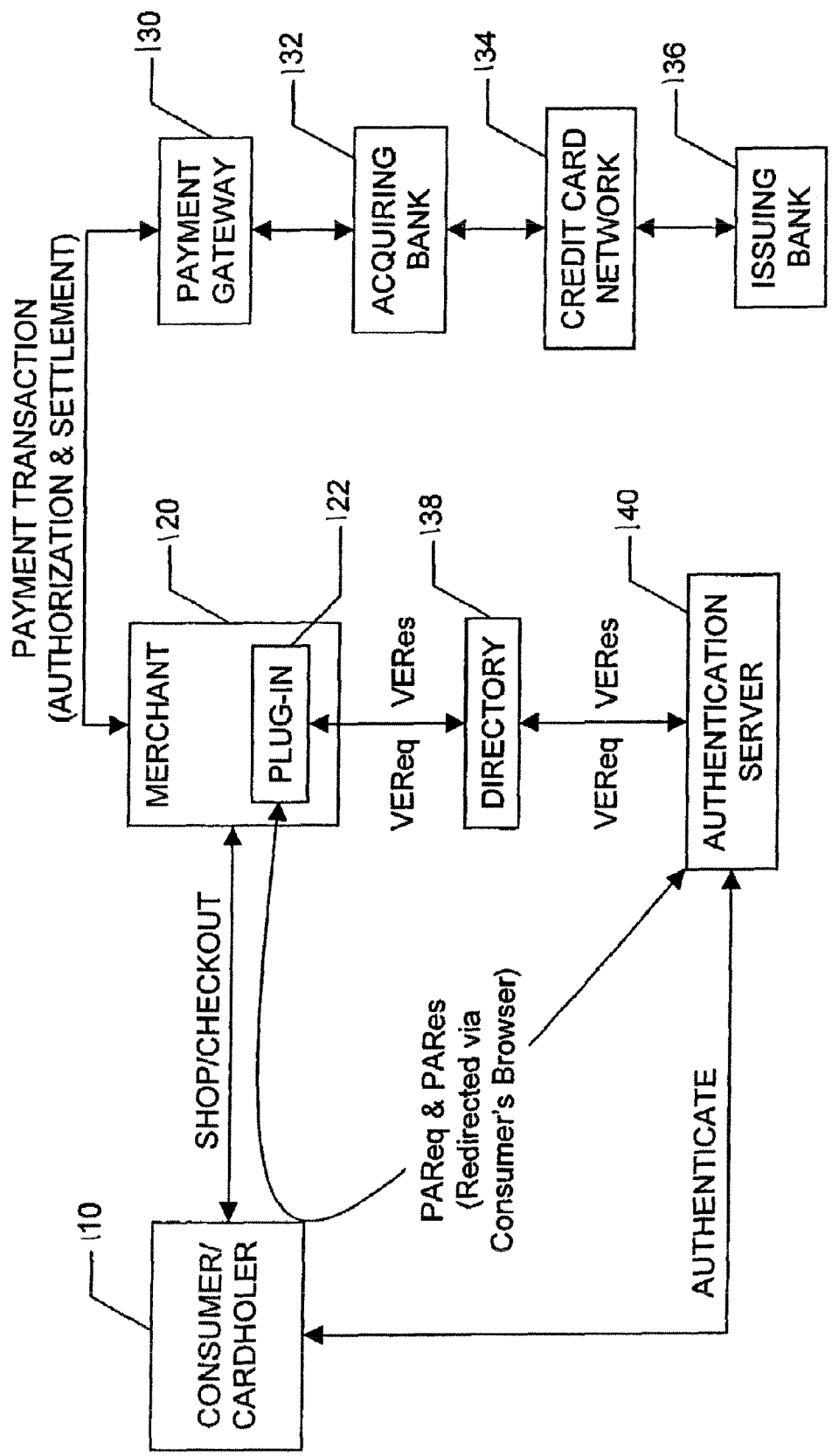
FIG. 1 is a block diagram illustrating a typical e-commerce transaction carried out in accordance with an exemplary authentication initiative/program of a credit a card network.
Figure 2:
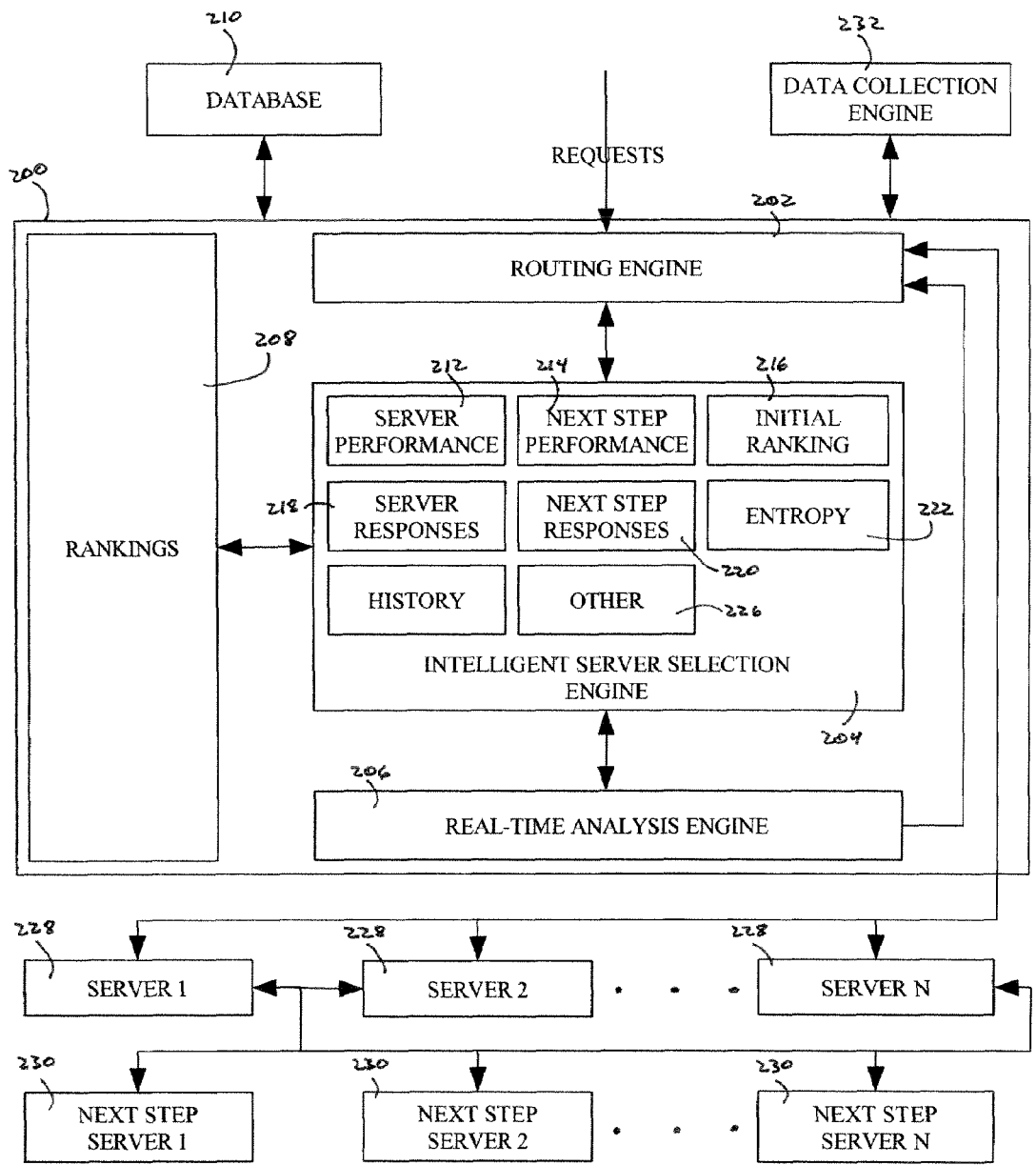
FIG. 2 is a block diagram illustrating an exemplary intelligent server router in accordance with aspects of the present invention.

With reference to FIG. 2, an exemplary intelligent server router 200 is provided. The intelligent server router 200 includes a routing engine 202, an intelligent server selection engine 204, a real-time analysis engine 206, and rankings 208. As should be appreciated, the components of the intelligent server router 200 may be localized to a single computing system, or distributed across a plurality of computing systems interconnected by a communications network, such as the Internet. The intelligent server selection engine 204 includes a server performance module 212, a next step performance module 214, an initial ranking module 216, a server response module 218, a next step response module 220, an entropy module 222, a history module 224, and an other module 226. Similar to the main components comprising the intelligent server router 200, the components of the intelligent server selection engine 204 may be localized to a single computing system, or distributed across a plurality of computing systems interconnected by a communications network. The intelligent server router 200 is further connected to a database 210, a plurality of servers 228, optionally, a plurality of next step servers 230 by way of the plurality of servers 228, and, optionally, a data collection engine 232. The database 210, the plurality of servers 228, the plurality of next step servers 230 and the data collection engine 232 are connected to the intelligent server router 200 by way of communications network, such as the Internet.

The plurality of servers 228 correspond to redundant servers for an e-commerce service, such as a web server. In other words, each of the plurality of servers 228 is provisioned to perform the same task as the other servers of the plurality of servers 228. The plurality of next step servers 230 correspond to servers from which the plurality of servers 228 depend. Prior to the deployment of the intelligent server router 200, the operator predefines the plurality of servers 228, the plurality of next step servers 230, and the dependencies between the plurality of servers 228 and the plurality of next step servers 228. Alternatively, a server operator may undergo a registration process with the intelligent server router 200, wherein the server operator registers the server as one of the plurality of servers 228 and provides the next step servers from which the server depends.

The routing engine 202 of the intelligent server router 200 receives requests via a communications network, such as the internet. A request may be a web request, an authentication request, an ftp request, or any other like request. Further, a request may be received from a typical home user browsing the internet, an e-commerce merchant, such as Amazon, or any other like party. More generally, as the skilled artisan will appreciate, communications networks, such as the Internet, generally work on the basis of a client/server model. Under such a model, a client sends a request to a server, and the server responds to the request. The present invention seeks to address these requests. Accordingly, the intelligent server router 200 might, for example, receive a web request for the Amazon home page, wherein there is a plurality of servers available to address the web request, such as the plurality of servers 228.

After receiving a request, the routing engine 202 notifies the intelligent server selection engine 204, and requests the identity of one of the plurality of servers 228. Preferably, the intelligent server selection engine 204 selects a server from the plurality of servers 228 that will achieve the best performance for the requester. The intelligent server selection engine 204 accomplishes this with a dynamic ranking of the plurality of servers on the basis of performance. This dynamic ranking is exemplified in the rankings 208 of the intelligent server router 200. As should be appreciated, the rankings 208 may be stored internal to the intelligent server selection engine 204, internal to the broader intelligent server router 200, or as part of the database 210. However, regardless of how the rankings 208 are stored, and assuming this ranking 208 to be up to date, the intelligent selection engine 204 need only select the most highly ranked server from the plurality of servers 228. Thereafter, the intelligent server selection engine 204 returns the selected server to the routing engine 202.

The intelligent server selection engine 204 ranks the plurality of servers 228 according to ranking information stored in the database 210. The ranking information may include server performance information, server response information, next step performance information, next step response information, historic information, and other like information. The database 210 may be internal to the intelligent server router 200 or external to the intelligent server router 200 and connected by way of a communications network. Further, the database 210 may be a traditional database such as a database provided by MySQL, MSSQL, Oracle, Microsoft Access, or other like database, or it may simply be a data structure stored within the memory of one of one or more computer systems comprising the intelligent server router 200. As will be discussed in more detail below, the ranking information is preferably populated by the data collection engine 232. However, as will become clear, the servers to which the ranking information corresponds may also populate the ranking information. Alternatively, the various modules of the intelligent server selection engine 204, discussed below, can be provisioned to collect the ranking information.

The intelligent server selection engine 204 includes a server performance module 212, a next step performance module 214, an initial ranking module 216, a server response module 218, a next step response module 220, an entropy module 222, a history module 224, and an other module 226. The initial ranking module 216 serves to initialize the rankings 208 of the plurality of servers 228. This may be as simple as randomly ranking the plurality of servers 228 or ranking the plurality of servers 228 in a predefined order. The operator of the server selection engine 200 may set the predefined order. Additionally, the predefined order may, for example, be stored in the database 210 or embedded within the initial ranking module 216. Alternatively, the initial ranking module 216 may rank the plurality of servers 228 on the basis of the geographic location of the plurality of servers 228, whereby servers located closer to the intelligent server router 200 are ranked higher than servers that are farther from the intelligent server router 200.

The server performance module 212 is provisioned to analyze server performance information for the plurality of servers 228 in the database 210 and provide a ranking of the plurality of servers 228. The server performance information includes information such as response times to requests, CPU load, memory usage, disk usage, and other like information bearing on the performance of a server. The server performance module 212 may provide the ranking through the use of different limit variables operative to provide a numerical representation of the server performance information. For example, although grossly simplified, server performance information for a server indicating a memory usage over 80% might receive a 1, whereas server performance information for another server indicating a memory usage under 80% might receive a 0. In this way, the server performance information for the plurality of servers 228 can be converted to numerical representation. After all of the relevant performance information has been analyzed, and converted to a numerical representation, the plurality of servers 228 can be ranked according to the summation of the numerical representations of their respective performance information. As should be appreciated, the limit variables may be predefined by the operator of the intelligent server router.

The server response module 218 is provisioned to analyze server response information for the plurality of servers 228 in the database 210 and provide a ranking of the plurality of servers 228. The server response information includes responses to requests returned by the plurality of servers 228 and other like information. Analyzing this information advantageously allows the intelligent server router 200 to take into account servers which have not completely failed, but are not returning proper responses. For example, in the context of web servers, instead of returning a merchant home page, a web server is returning a 404 error due to an internal disk failure. Similar to the server performance module 212, the server response module 218 may provide the ranking through the use of different limit variables operative to provide a numerical representation of the server response information. For example, server response information indicating success might receive a 1, whereas server response information for a server indicating that the server is only responding with error messages might receive a 0. Thereafter, the plurality of servers 228 can be ranked in a similar manner discussed in the server performance module 212, wherein the plurality of servers 228 are ranked according to the summation of the numerical representations of their respective response information. Further, the limit variables may be predefined by the operator of the intelligent routing system.

The next step performance module 214 is provisioned to do much the same thing as the server performance module 212, with the exception that it is ranking the plurality of servers 228 on the bases of performance information for the plurality next step servers 230. That is to say, the next step performance module 214 is provisioned to analyze server performance information for the plurality of next servers 230 in the database 210 and provide a ranking of the plurality of servers 228. The plurality of next step servers 230 correspond to servers from which the plurality of servers 228 depend, such that in processing a request, the plurality of servers 228 have the step of submitting a next step request to the plurality of next step servers 230, wherein the response to the next step request is used to respond to the request. As should be appreciated, each of the plurality of servers 228 may depend upon a different subset of the plurality of next step servers 230. For example, server 1 of the plurality of servers 228 may only depend upon next step server 1 of the plurality of next step servers 230, and server 2 of the plurality of servers 228 may only depend upon next step server 2 of the plurality of next step servers 230.

Similar to the server performance information, the next step performance information includes information such as response times to next step requests, CPU load, memory usage, disk usage, and other like information bearing on the performance of a server. The next step performance module 214 may provide the ranking of the plurality of servers 228 through the use of different limit variables operative to provide a numerical representation of the next step performance information. In this way, the next step performance information for the plurality of next step servers 230 can be converted to numerical representation. After all of the relevant next step performance information has been analyzed, and converted to a numerical representation, the plurality of servers 228 can be ranked according to the summation of the numerical representations of next step performance information of their respective next step servers. As should be appreciated, this provides a useful ranking of the plurality of servers 228 because the plurality of next step servers 230 directly affects the performance of the plurality of servers 228. Further, the limit variables may be predefined by the operator of the intelligent server router 200.

The next step response module 220 is provisioned to do much the same thing as the server response module 218, with the exception that it is ranking the plurality of servers 228 on the bases of the plurality next step servers 230. That is to say, the next step response module 220 is provisioned to analyze next step response information for the plurality of next step servers 230 in the database 210 and provide a ranking of the plurality of servers 228. The next step response information includes responses to next step requests, which are returned by the plurality of next step servers 230. The next step response information may further include other like information. Analyzing this information advantageously allows the intelligent server router 200 to take into account next step servers which have not completely failed, but are not returning proper responses. Naturally, because the plurality of servers 228 depend from the plurality of next step servers 230, failure of the plurality of next step servers 230 will directly affect the plurality of servers 228 depending therefrom. Similar to the next step performance module 214, the next step response module 220 provides the ranking through the use of different limit variables operative to provide a numerical representation of the next step response information. Thereafter, the plurality of servers 228 can be ranked in a similar manner discussed in the next step performance module 214, wherein the plurality of servers 228 can be ranked according to the summation of the numerical representations of next step response information of their respective next step servers. Further, the limit variables may be predefined by the operator of the intelligent routing system.

The history module 224, as its name would suggest, is provisioned to analyze historic information for the plurality of servers 228 in the database 210 and provide a ranking of the plurality of servers 228. The historic information may include previous rankings, server performance information, server response information, next step performance information, next step response information, and other like information. The history module 224 may provide the ranking through the use of different limit variables operative to provide a numerical representation of archived server performance information, server response information, next step performance information, next step response information, and other like information. Alternatively, the history module 224 may provide the ranking through the use of previous rankings, wherein a numerical representation of the historic information will already exist. Thereafter, the plurality of servers 228 can be ranked in the same way described in connection with the server performance module 212, next step performance module 214, server response module 218, and next step response module 220. Further, as should be appreciated, the limit variables may be predefined by the operator of the intelligent server router 200.

With the forgoing rankings from the various modules, the intelligent server selection engine 204 globally ranks the plurality of servers 228, thereby defining the rankings 208. This may manifest as taking the weighted summation of the rankings from the server performance module 212, next step performance modules 214, server response module 218, and next step response module 220. The other module 226 may further be provisioned to provide a ranking of the plurality of servers 228, whereby the weighted summation could further include the other module 226. The operator of the intelligent server router 200 may determine the weights for each ranking, such that the operator can, for example, choose to give more weight to the rankings generated by the server performance module 212 than the rankings generated by the next step performance module 214. Further, as should be appreciated, the server performance module 212, next step performance modules 214, server response module 218, next step response module 220, and, optionally, the other module 226 may be provisioned to update their rankings over different periods of time, whereby the server performance module 212 may, for example, update more frequently than the next step response module 220. The operator of the intelligent routing system 200 may advantageously set these periods. The global rankings are preferably updated whenever one of the server performance module 212, next step performance modules 214, server response module 218, next step response module 220 update, and, optionally, the other module 226 updates.

Notwithstanding the forgoing ranking scheme of the intelligent server selection engine 204, the skilled artisan will appreciate that the present invention is equally amenable to other ranking schemes. For example, instead of the server performance module 212, next step performance modules 214, server response module 218, next step response module 220, and, optionally, the other module 226 returning rankings, said modules may simply return the numerical representations of their respective information, whereby the intelligent server selection engine 204 would generate the rankings 208 of the plurality of servers 228 on the basis of the weighted summation of the numerical representations of the information corresponding to each of the plurality of servers 228.

The entropy module 222 of the intelligent server selection engine 204 is provisioned to periodically re-rank the rankings 208 of the plurality of servers 228 in random order. Alternatively, the entropy module 222 may simply reverse the order of the rankings 208. As should be appreciated, this advantageously removes any historic bias that may have accrued over time and ensures that servers that have typically underperformed are periodically reconsidered in case the performance issues have been resolved. The operator of the intelligent server router 200 may define the period of the re-ranking. For example, every day the rankings 208 of the plurality of servers 228 may be re-ranked. Further, notwithstanding that too much historic bias is a negative, the re-ranking may also include a historic bias which is preferably in moderation.

The routing engine 202, in conjunction with the server response module 218 and the next step response 220 module, can further be provisioned to determine if non-performance is due to a system failure or intentional (e.g., fraudulent) behavior. Namely, the routing engine 202 can generate test requests, and the server response module 218 and the next step response module 220 can track the requests through the system. Naturally, since the responses to the test requests should be known, a comparison can be made between the known responses and the actual responses at both the server response module 218 and the next step response module 220. If the responses don't match, there is a chance that there is fraudulent activity at play. Accordingly, the next step response module 220 and/or the server response module 218 can flag a questionable server so as to, for example, disable it until the operator of the intelligent router system 200 can investigate.

After receiving the identity of one of the plurality of servers 228 from the intelligent server selection engine 204, the routing engine 202 routes the request to the identified server. Thereafter, the server which received the request will ideally process and respond to the request in an optimal amount time, wherein the response will be routed back through the routing engine 202 to the requester. However, regardless of the sophistication of the ranking systems, the intelligent server selection engine 204 is still fallible due to the generally unforeseeable nature of system failures. For example, although the identified server might have had high performance when the request was routed to it, the identified server may suffer a system crash before responding to the request.

The real-time analysis engine 206 monitors unprocessed requests, and is provisioned to notify the routing engine 202 to re-route the request if certain non-performance criteria are met. The routing engine 202 would then request the identity of another server from the plurality of servers 228 from the intelligent server selection engine 204 and re-route the request as described above. Such non-performance criteria may, for example, be based upon wait time, wherein requests that have remained unprocessed for a certain amount of time will be re-routed. The non-performance criteria may be pre-defined by the operator of the intelligent server router 200, or may be adaptive. For example, during peak demand for an electronic service, an optimal response time might be 100 ms, whereas an optimal response time during off time might be 10 ms. The performance criteria may change depending upon the time of day. The real-time analysis engine 206 can further be provisioned to notify the intelligent server selection engine 204 of the non-performance of the non-performant server. In response, the intelligent server selection engine 204 could, for example, disable the non-performant server.

The intelligent server router 200 optionally includes the data collection engine 232. The data collection engine 210 may be internal to the intelligent server router 200 or external to the intelligent server router 200 (as shown in FIG. 2) and connected by way of a communications network. The data collection engine 232 collects the ranking information, i.e., the server performance information, the next step performance information, the server response information, the next step response information, the historic information, and other like information, used by the intelligent server selection engine 204 to rank the plurality of servers 228. Thereafter, the data collection engine 232 stores the collected information in the database 210. Alternatively, the database 210 may be updated with the ranking information without the use of the data collection engine 232. In such an embodiment, the plurality of servers 228 and/or the next step servers 230 populate the ranking information. In yet another alternative embodiment, the various modules, discussed above, of the intelligent server selection engine 204 are provisioned to collect their respective ranking information. For example, the server performance module 212 may be provisioned to collect server performance information from the plurality of servers 228. However, regardless of the approaches discussed above, the skilled artisan will appreciate that, for the present invention, it matters not how the information is collected; rather, it only matters that the information is available.

Figure 3:
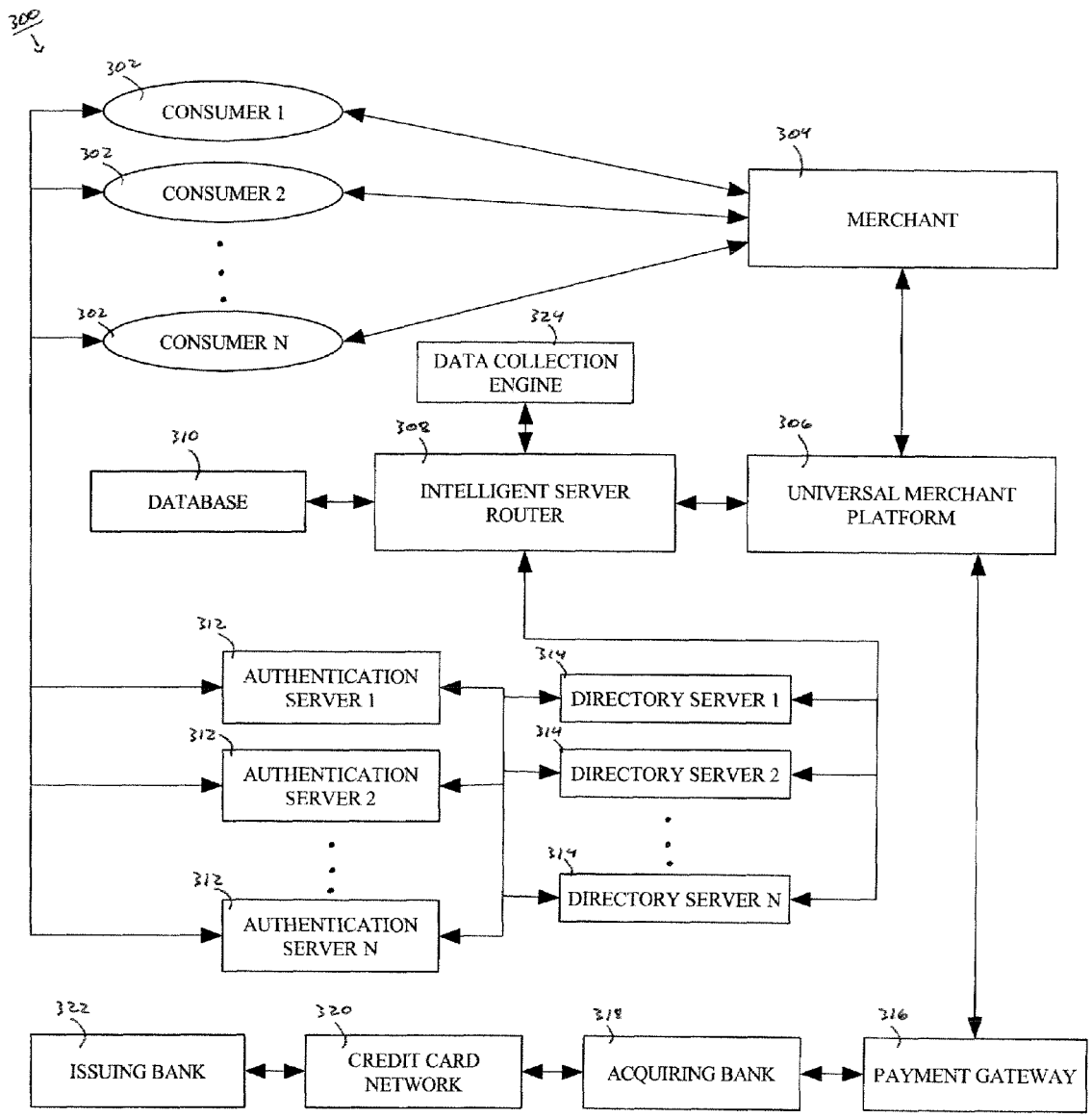
FIG. 3 is a high level overview of an exemplary system in which the exemplary intelligent server router of FIG. 2 finds particular application.

With reference to FIG. 3, an exemplary system making use of the intelligent server router 200 of FIG. 2 is illustrated. Particularly, the exemplary system illustrates the use of the intelligent server router 200 with certain authentication initiatives, such as Visa's Verified by Visa (VbV) initiative. Therein, directory servers are employed in connection with processing transaction authentication requests. The system includes a plurality of consumers 302, a merchant 304, a universal merchant platform 306, an intelligent directory server router 308, a database 310, a plurality of directory servers 314, a plurality of authentication servers 312, a payment gateway 316, an acquiring bank 318, a credit card network 320, an issuing bank 322 and a data collection engine 324. Preferably, the foregoing components are connected via a communications network, such as the Internet.

The plurality of consumers 302 will generally be the average web users browsing the internet on their home computers with a standard web browser, e.g., Firefox. However, the plurality of consumers 302 may also take other forms, such as, but not limited to, governments and companies acting through their employees. The merchant 304 generally refers to the average electronic retailer with an internet website operative to allow the consumer 302 to purchase goods and/or services electronically, e.g., Amazon or CDW. The database 310, the data collection engine 324 and the intelligent server router 308 are attributed the same meaning as the database 210 of FIG. 2, the data collection engine 232 of FIG. 2, and the intelligent server router 200 of FIG. 2, respectively.

Tracking the flow of a transaction within the system 300 of FIG. 3, the transaction begins with one of the plurality of consumers 302, e.g., consumer 1. As is commonly known, a consumer generally browses a website of a merchant 304 and adds items to purchase into a shopping cart. Once the consumer has finished browsing the website, the consumer has the option to view the items within their shopping cart and checkout. If the consumer chooses to checkout, the consumer selects an appropriate payment method based on the initiatives supported by the merchant 304. That is to say, the consumer selects one of a plurality of different payment instrument types supported by the merchant 304. As should be appreciated, the plurality of different payment instrument types generally belong to different payment networks, wherein the plurality of different payment instrument types have different authentication protocols prescribed therefor by their respective payment networks. At that point, the consumer generally fills out an on-line checkout form, which typically includes fields to enter a payment option, a card number, an expiration date, etc. Hereinafter, this information will be collectively referred to as the transaction information or the payment information. Further, it should be appreciated that the transaction information identifies a payment instrument, such as a Visa credit card.

After the consumer 302 finishes entering the transaction information, the transaction information is sent to the merchant 304. Thereafter, the merchant 304 may choose to take the appropriate steps to process the transaction itself. Under this option, the merchant 304 will handle the authorizing and capturing of funds to complete the transaction. Further, in the case of authentication payment initiatives, the merchant 304 will interface with directory servers and authentication servers. However, in contrast with the traditional approach, the merchant 304 of the present invention will interface with the directory servers via the intelligent server router 308. Alternatively the merchant 304 may choose to forward the transaction information to the universal merchant platform 306, wherein the universal merchant platform 306 will finish processing the transaction. This communication with the universal merchant platform 306 is conducted using a unified message format. The following discussion presupposes this embodiment. However, it should be appreciated that should the former embodiment be chosen, it will simply be the merchant 304 communicating with the intelligent server router 308, and not the universal merchant platform 306.

For detailed information regarding the universal merchant platform 306, refer to U.S. Pat. No. 7,051,002 for "Universal Merchant Platform for Payment Authentication," incorporated herein by reference. However, generally, the universal merchant platform serves as a centralized merchant processing system for authenticated payments, allowing a merchant to securely and easily accommodate authentication of consumers and/or cardholders in accordance with a variety of authentication initiatives implemented by credit card networks, and to process electronic transactions through any payment network using a single platform. It also enables merchants to process these payments, regardless of which payment network they are to be routed through, with a single implementation. Moreover, it allows them or a funding source to use the established underlying payment processing infrastructure to process their credit/debit instruments at participating merchant sites.

The advantages to funding sources are: the ability to authenticate users and process all electronic transactions through a single platform; the ability to seamlessly process payments using any given payment network, a reduction in processing costs; increased use of their credit/debit instrument; increased acceptance of their credit/debit instrument; the ability to send authenticated payment and authorization requests to any network; the ability to receive detailed consumer purchasing behavior statistics. Likewise, there are advantages to the merchant, including, but not limited to: the ability to comply with, participate in, and enjoy the benefits of a variety of authentication initiatives; the ability to authenticate consumers using different payment vehicles or credit cards, thereby avoiding lost sales; and, protection from fraud.

Assuming the universal merchant platform 306 is used, after the universal merchant platform 306 receives the transaction information, the universal merchant platform 306 will typically seek to verify the enrollment of the selected payment instrument within an authentication initiative. Normally, this manifests with the universal merchant platform 306 submitting an enrollment request directly to a directory server, such as any one of the plurality of directory servers 314. The universal merchant platform 306 generates the enrollment request according to a message format prescribed by payment instrument type to which the payment instrument corresponds. The enrollment request includes information identifying the payment instrument of the transaction information, such as the card number. However, utilizing the intelligent server router 308 of the present invention, the enrollment request is submit to the intelligent server router 308. Therein, the intelligent server router 308 determines a directory server from the plurality of directory servers 314, as outlined above in connection with FIG. 2. As should be recalled, the intelligent server router 308 will maintain a dynamic ranking of the plurality of directory servers 314. Once a directory server is determined, the intelligent server router 308 routes the enrollment request the determined directory server. This could be, for example, directory server 1 of the plurality of directory servers 314.

After the determined directory server receives the enrollment request, the directory server looks to a database associating card number ranges with locations or addresses, e.g., universal resource locator (URL) addresses, of issuing banks' authentication servers, e.g., the authentication server for issuing bank. As should be appreciated, an issuing bank refers to the bank that issued the payment instrument (e.g., the credit card). Thereafter, the enrollment request is sent to the authentication server of the issuer of payment method selected by the consumer. This authentication server is represented as one of the plurality of authentication servers 312, e.g., authentication server 1. The authentication server will then verify that the selected payment instrument is enrolled in an authentication initiative. If the selected payment instrument is enrolled, the authentication server returns a URL to the directory server. The URL corresponds to a URL for the consumer to authenticate directly with the authentication server. Alternatively, if the selected payment instrument is not enrolled, the authentication server returns a message to that effect to the directory server. Once, the directory server receives the response to the enrollment request, the directory server returns the enrollment response to the universal merchant platform 306 by way of the intelligent server router 308.

The universal merchant platform 306 then does one of at least two things: it proceeds with authentication or it proceeds to authorize and capture the funds for the transaction. Under the latter option, for example, the universal merchant platform sends an authorization/capture message to the payment gateway 316. The payment gateway 316 routes the data to the acquiring bank 318 based on the acquirer's specification. The acquiring bank 318 then sends the data via the appropriate credit card network 320 to the issuing bank 322 for settlement. The skilled artisan will understand this process to be well known in the art, whereby the forgoing merely exemplifies one method of authorizing and capturing funds. Under the former option, the universal merchant platform 306 generates an authentication request, which it provides to the merchant 304. The universal merchant platform 306 further provides the merchant 304 with the URL of the authentication server. The merchant 304 then provides the consumer with the authentication request and redirects the consumer to the URL of the authentication server. Once at the authentication server, the consumer submits the authentication request to the authentication server and directly authenticates with the authentication server.

After the consumer finishes with the authentication server, an authentication response message is returned to the merchant 304 by way of the consumer. Thereafter, the merchant 304 provides the universal merchant platform 306 with the authentication response from the authentication server. If the authentication response yields a successful authentication, the universal merchant platform 306 completes the transaction. Namely, the universal merchant platform 306 sends an authorization/capture message to the payment gateway 316. The payment gateway 316 routes the data to the acquiring bank 318 based on the acquirer's specification. The acquiring bank 318 then sends the data via the appropriate credit card network 320 to the issuing bank 322 for settlement. The skilled artisan will understand this process to be well known in the art. Alternatively, if the authentication response failed to yield a successful authentication, the universal merchant platform 306 instructs the merchant 304 of the failure, whereby the merchant 304 can prompt the consumer to select an alternative payment method.

It is to be appreciated that suitably, the methods and systems described herein are embodied by a computer, or other digital processing device including a digital processor, such as a microprocessor, microcontroller, graphic processing unit (GPU), etc. and storage. In other embodiments, the systems and methods may be embodied by a server including a digital processor and including or having access to digital data storage, such server being suitably accessed via the Internet or a local area network, or by a personal data assistant (PDA) including a digital processor and digital data storage, or so forth. The computer or other digital processing device suitably includes or is operatively connected with one or more user input devices, such as a keyboard, for receiving user input, and further includes, or is operatively connected with, one or more display devices. In other embodiments, the input for controlling the methods and systems is received from another program running previously to or concurrently with the methods and systems on the computer, or from a network connection, or so forth. Similarly, in other embodiments the output may serve as input to another program running subsequent to or concurrently with methods and systems on the computer, or may be transmitted via a network connection, or so forth.

In some embodiments, the exemplary methods, discussed above, the system employing the same, and so forth, of the present application are embodied by a storage medium storing instructions executable (for example, by a digital processor) to implement the exemplary methods and/or systems. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that in connection with the particular exemplary embodiments presented herein certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof. That is to say, it will be appreciated that various of the above-disclosed and other features and functions, or alternatives thereof, may be desirably combined into many other different systems or applications, and also that various presently unforeseen or unanticipated alternatives, modifications, variations or improvements therein may be subsequently made by those skilled in the art which are similarly intended to be encompassed by the following claims.

The invention claimed is:

1. A computer implemented method for routing requests to one of a plurality of redundant servers, wherein the plurality of redundant servers provides services over a communications network, said method comprising:
   dynamically ranking the plurality of redundant servers according to ranking information which includes server performance information and server response information;
   receiving a request via the communications network;
   selecting a highest ranked redundant server from the plurality of redundant servers for the request; routing the request to the highest ranked redundant server;
   determining unprocessed requests which meet a criteria of server non-performance, wherein unprocessed requests are requests which have not been processed by the corresponding highest ranked redundant serve;
   updating the highest ranked redundant server for each of the determined unprocessed requests; and
   re-routing each unprocessed request to the highest ranked redundant server.

2. The computer implemented method of claim 1, wherein the intelligent server selection engine periodically re-ranks the plurality of redundant servers in random order.

3. The computer implemented method of claim 2, wherein the random order is further modified with a historic bias.

4. The computer implemented method of claim 1, wherein the requests are received from a universal merchant platform.

5. The computer implemented method of claim 1, wherein the plurality of redundant servers include directory servers for authentication initiatives.

6. The computer implemented method of claim 1, wherein the ranking information further include at least one of:
   previous rankings,
   next step performance information which includes performance information pertaining to servers upon which the plurality of redundant servers depend, and
   next step response information which includes response information pertaining to servers upon which the plurality of redundant servers depend.

7. The computer implemented method of claim 1, wherein the ranking information includes numerical representation of ranking information and limit variables which operate to limit different ranking information.

8. The computer implemented method of claim 1, wherein the request is a test request to diagnose issues of nonperformance.

9. An intelligent server router for routing requests to one of a plurality of redundant servers, wherein the plurality of redundant servers provides services over a communications network, said system comprising:
   an intelligent server selection engine provisioned to dynamically rank the plurality of redundant servers according to ranking information, wherein the ranking information includes server performance information and server response information, wherein the intelligent server selection engine further selects a highest ranked redundant server from the plurality of redundant servers according to the ranking of the plurality of redundant servers;
   a real-time analysis engine provisioned to determine unprocessed requests which meet a criteria of non-performance and update the rankings for the selected redundant server for each of the determined unprocessed requests, wherein unprocessed requests are requests which have not been processed by the highest ranked redundant servers selected by the intelligent server selection engine; and
   a routing engine provisioned to receive the requests and route each of the requests to one of the plurality of redundant servers, wherein the one of the plurality of redundant servers is a highest ranked redundant server selected by the intelligent server selection engine, wherein the routing engine is further provisioned to re-route unprocessed requests to the highest ranked redundant servers.

10. The intelligent server router of claim 9, further comprising:
   a data collection engine provisioned to collect ranking information from the plurality of redundant servers and/or a plurality of next step servers from which the plurality of redundant servers depend.

11. The intelligent server router of claim 9, wherein the intelligent server selection engine periodically re-ranks the plurality of redundant servers in random order.

12. The intelligent server router of claim 9, wherein the routing engine receives the requests from a universal merchant platform.

13. The intelligent server router of claim 9, wherein the plurality of redundant servers include directory servers for authentication initiatives.

14. The intelligent server router of claim 9, wherein the ranking information further includes at least one of: previous rankings, next step performance information, and next step response information.

15. The intelligent server router of claim 9, wherein the ranking information includes numerical representation of ranking information and limit variables which operate to limit different ranking information.

16. A computer implemented method for supporting authentication processing of a commercial transaction conducted over a communications network between a first party and a second party, wherein the commercial transaction uses one of a plurality of different payment instrument types belonging to different payment networks, said plurality of different payment instrument types having different authentication protocols prescribed therefor by their respective payment networks, said method comprising:
  (a) obtaining payment information from the first party according to a unified message format, wherein the first party received the payment information from the second party, wherein the payment information includes a payment instrument identifying the one of the plurality of different payment instrument types;
  (b) selecting one of at least one directory server associated with the one of the plurality of different payment instrument types, wherein each of the at least one directory server is ranked according to an intelligent server selection engine that dynamically ranks the at least one directory server according to ranking information, wherein the ranking information includes server performance information and server response information, wherein the one of the at least one directory server is a highest ranked directory server;
  (c) routing the payment instrument to the selected directory server according to a message format of the one of the plurality of different payment instrument types, wherein the selected directory server routes the payment instrument to an authentication server associated with the payment instrument; and
  (d) obtaining an enrollment determination of the payment instrument from the selected directory server, wherein the selected direct server receives the enrollment determination of the payment instrument from the authentication server.

17. The computer implemented method of claim 16, further comprising:
  obtaining an authentication determination from the authentication server, wherein the second party authenticates directly with the authentication server; and
  returning the obtained authentication determination to the first party using the unified message format.

18. The computer implemented method of claim 16, wherein the ranking information includes next step performance information and next step response information, wherein the next step performance information and the next step response information include information pertaining to the authentication server.

19. The computer implemented method of claim 16, wherein the at least one directory server includes a plurality of directory servers, and the the intelligent server selection engine periodically re-ranks the plurality of directory servers in random order.

* * * * *